J. C. PETTIBONE.
NAIL CLIPPER.
APPLICATION FILED SEPT. 2, 1911.

1,066,839.

Patented July 8, 1913.

WITNESSES:
H. W. Meade

INVENTOR
John C. Pettibone
BY
A. M. Wooster
ATTORNEY

UNITED STATES PATENT OFFICE.

JOHN C. PETTIBONE, OF ANSONIA, CONNECTICUT, ASSIGNOR TO CHARLES GEIDER, JR., OF ANSONIA, CONNECTICUT.

NAIL-CLIPPER.

1,066,839.      Specification of Letters Patent.      Patented July 8, 1913.

Application filed September 2, 1911. Serial No. 647,441.

*To all whom it may concern:*

Be it known that I, JOHN C. PETTIBONE, a citizen of the United States, residing at Ansonia, county of New Haven, State of Connecticut, have invented an Improvement in Nail-Clippers, of which the following is a specification.

Figure 1:
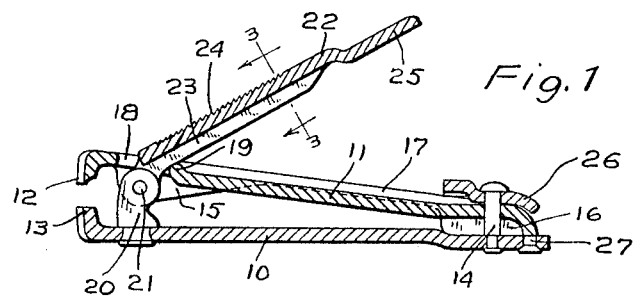
Figure 2:
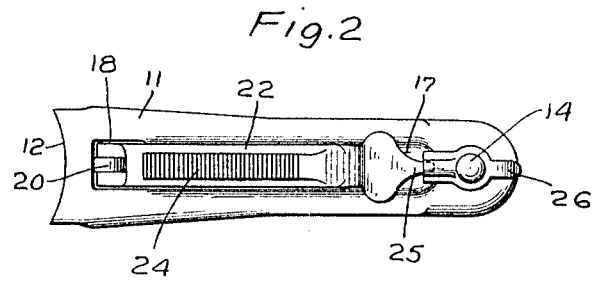
Figure 3:
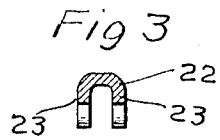

This invention relates to nail clippers and has for its object to provide a device of this character which will be of a simple and compact construction, involving a minimum number of parts, and which will be convenient and efficient in use. These and other objects of the invention, together with means whereby the same may be carried into effect, will best be understood from the following description of one form or embodiment thereof illustrated in the accompanying drawings, in which:

Figure 1 is a longitudinal section. Fig. 2 is a plan view. Fig. 3 is a detail section taken substantially on the line 3—3 Fig. 1.

The improved nail clipper comprises a pair of arms including an arm 10, which is preferably formed of suitable material, such as spring steel, so as to be more or less resilient, and an arm 11 also formed of the same or similar material but preferably of such a shape as to be substantially rigid. At one end of the device the arms 10 and 11 are provided with coöperating inturned cutting members 12 and 13 respectively. At the opposite end the arm 11 is formed with an integral inturned lip 27 which enters an opening formed in the arm 10 adjacent the end thereof and is riveted therein, thereby connecting said arms. The arms 10 and 11 are further secured together by means of a rivet 14. As shown, the cutting member 12 is provided with a sharp cutting edge, while the member 13 has a flat or slightly inwardly beveled face the outer edge of which coöperates with the cutting edge of the member 12.

The arm 11 is preferably formed with lateral flanges or turned edge portions 15 and 16, the latter lying adjacent the lip 27 and engaging the inner face of the arm 10. The arm 11 is further formed with a depressed portion forming a longitudinal groove or corrugation 17 terminating in an opening 18 at the edge of which, adjacent said groove 17, is an integral lip 19. The flanges or turned edges 15 serve the purpose of housing the pivot for the operating lever, hereafter described, the groove 17 provides a clearance to facilitate the operation of said lever, while the flange 16 serves to provide a firm bearing between the arms 10 and 11 and to separate these arms a sufficient distance to provide a suitable space for the pivot of the operating lever. The flanges 15 and 16 and corrugation 17 further contribute to the longitudinal rigidity of the arm 11.

20 denotes a lug riveted to the arm 10 and to which is pivoted, as at 21, the operating lever 22 extending through the opening 18 in the arm 11. Said lever is substantially U-shaped in cross section, as shown in Fig. 3, the opposite parallel sides 23 thereof being pivoted to said lug 20 and engaging at their edges the lip 19. Said lever 22 is formed on its upper surface with a nail file 24 and at its outer end with a cleaning point 25.

26 denotes a catch pivoted on the rivet 14 to the arm 11 and adapted to engage the free end or point 25 of said lever 22 to lock the same, as shown in Fig. 2.

The operation of the device will, it is thought, be obvious without further explanation. It will be observed, however, that the construction of the device is extremely simple, light, and compact while the clipper as a whole involves in its construction a very small number of parts in comparison with similar devices of equal efficiency and convenience of operation as heretofore constructed.

Having thus described my invention, I claim:

A nail clipper comprising a rigid arm having a stud and a resilient arm rigidly secured to the rigid arm, said resilient arm having an opening therethrough, a longitudinal groove and at the forward end of said groove and contiguous to the opening a lip, and an operating lever U-shaped in cross section whose edges engage the lip, substantially as described, for the purpose set forth.

In testimony whereof I affix my signature in presence of two witnesses.

JOHN C. PETTIBONE.

Witnesses:
    FRED B. JOY,
    FRANKLIN B. BURTON.

---

Copies of this patent may be obtained for five cents each, by addressing the "Commissioner of Patents, Washington, D. C."